Figure 1:
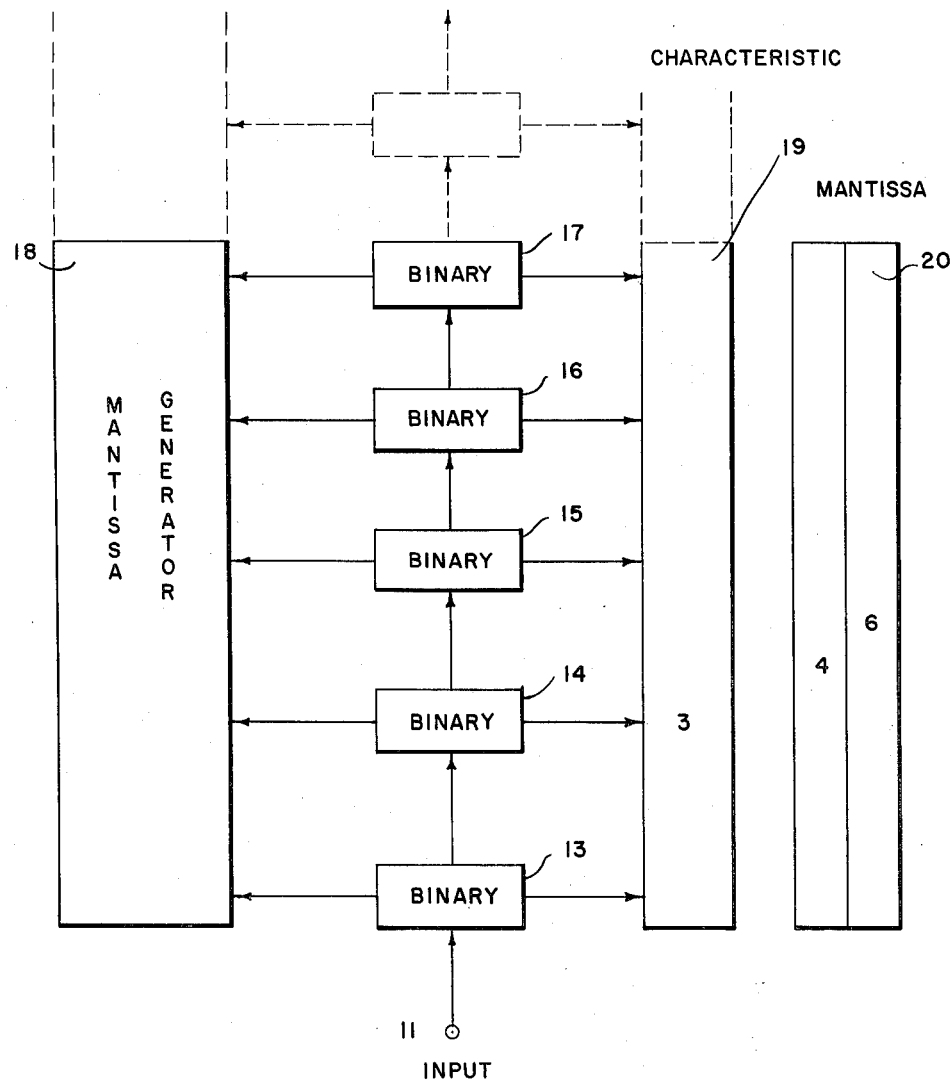

May 29, 1962　　　J. M. BRINKERHOFF　　　3,036,774
COMPUTING APPARATUS
Filed Nov. 29, 1960　　　　　　　　　　　　2 Sheets-Sheet 1

INVENTOR.
JORIS M. BRINKERHOFF
BY
ATTORNEY

May 29, 1962     J. M. BRINKERHOFF     3,036,774
COMPUTING APPARATUS

Filed Nov. 29, 1960     2 Sheets-Sheet 2

INVENTOR.
JORIS M. BRINKERHOFF
BY Weingarten, Orenbuch & Pandiscio
ATTORNEY

United States Patent Office 3,036,774
Patented May 29, 1962

3,036,774
COMPUTING APPARATUS
Joris M. Brinkerhoff, Arlington, Mass., assignor, by mesne assignments, to Laboratory for Electronics, Inc., Boston, Mass., a corporation of Delaware
Filed Nov. 29, 1960, Ser. No. 72,337
10 Claims. (Cl. 235—164)

This invention relates in general to digital pulse counters and more particularly to a system providing as an output the logarithm of the number of pulses received by a scaler in a previous measuring interval.

Digital pulse counters are very well known in the art and have found wide applications, not only in the computer field proper, but in many measurement fields such as counting of nuclear particles and similar physical counting applications. In many cases where computations are to be performed on the physical data so accumulated, it is the loragithm of the accumulated counts, rather than the counts themselves, which is to be used in the computation. Circuits providing an output indication of the logarithm of the number of pulses, or "counts" received, have been developed and are quite widely used. In general, these circuits operate on an analog basis, that is, rather than perform a digital computation on the number of counts, an electrical or other analog having a continuous logarithmic response is developed and the output of this analog is translated into digital information representing the logarithm of the total number of counts accumulated. Analog circuits of this type have, in many instances, attained reasonably good accuracy; however, they lack both the precision and the wide range of devices which are completely digital. Digital devices are capable of operations over a wide range since they are usually repetitive units; hence, by including more repetition cycles, the ranges can be made very large. Again, since the basis of digital counting is a plurality of stable states, these counters do not suffer from the zero "drift" associated with generating a continuous function, as is done in analog devices.

A typical application in the nucleonics field where extremely wide ranges of logarithmic response are required is in the measurement of the mass of a material by virtue of its radiation absorption characteristics. The mass is proportional to the logarithm of the quantity of radiation absorbed and a factor of five difference in mass may correspond to a factoral difference of $10^5$ in the number of counts accumulated in a given interval, in which case a five decade logarithmic response would be required. Larger factors of mass difference will require correspondingly larger numbers of decades over which the response must be logarithmic. Computers capable of digitally computing the logarithm of an accumulated number of pulses have been developed, and in general these operate by computing the series expression of the logarithm. Such computers are very complex and involve a large number of components operating at very high speeds.

It is, therefore, a primary object of the present invention to provide an economical, simplified digital logarithmic scaler providing the logarithm of the number of pulses accumulated in a previous interval.

It is another object of the present invention to provide a scaler which can provide as an output the logarithm of the number of pulses accumulated and which can operate over a very wide range of input values.

It is still another object of the present invention to provide an electronic scaler having a logarithmic output which can operate at high speed and is free from zero "drift."

Broadly speaking, the logarithmic scaler of the present invention computes precisely the logarithm characteristic and provides a digitally computed value of the mantissa. The mantissa value is not precise, but is rather an approximation involving a linear interpolation in which the average error may be made to be substantially zero and which never deviates more than a small percentage from the true value.

Thus, any positive whole number, N, may be expressed as follows:

$$N = 2_n(1+x)$$

where $n$ is a positive integer, and $x$ has a value between 0 and 1. The logarithm to the base 2 of a number thus represented has a characteristic of value $n$, while the mantissa is equal to $\log_2(1+x)$. In the present invention the $\log_2(1+x)$ is approximated by $kx$. In one embodiment $k$ is chosen to have a value such that the average error in the approximation is substantially equal to zero. It can be shown that a value of $k$ for which the average error is zero is $k=1.1146$. Using this value of $k$, the root mean square deviation in the error equals $4.49 \times 10^{-2}$.

Figure 2:
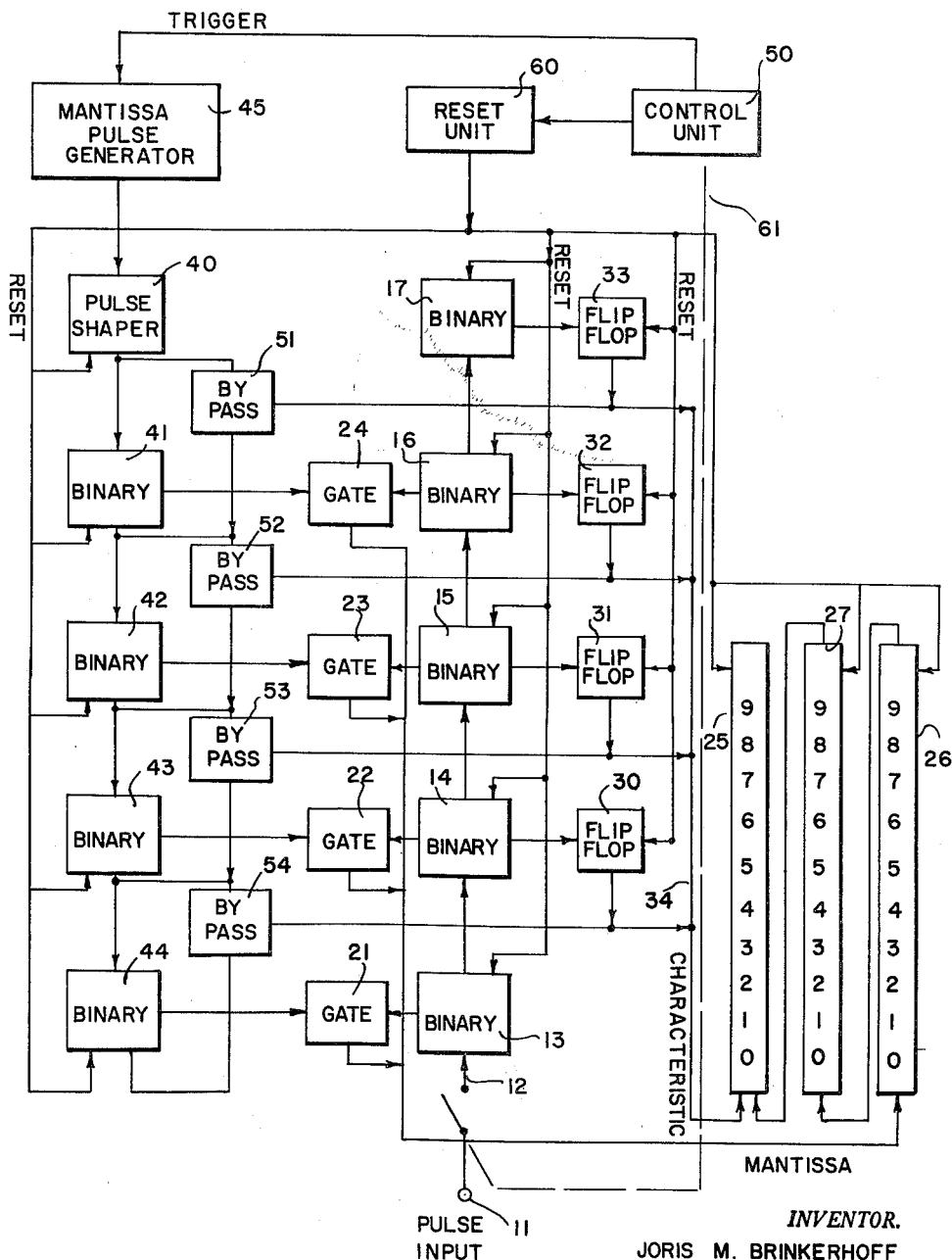

Other objects and advantages will become apparent from the following detailed description when taken in conjunction with the accompanying drawings in which:

FIG. 1 is an illustration in block diagram form of an apparatus in accordance with this invention; and, FIG. 2 is an illustration in block diagrammatic form of a more detailed embodiment of this invention in which like numbers refer to like parts.

With reference now to FIG. 1, a group of binary elements 13 through 17 are serially connected in cascade. Each of these binary elements has a single input and is adapted to change state in response to pulses applied to its input. For convenience, the two states may be referred to as "on" and "off." Each binary provides an output to the next binary only when changing from the "on" to the "off" state. The input to the first binary 13 is provided from pulse input terminal 11, but the following binary elements derive their input from the output of the immediately preceding binary. If all the binaries are initially in the "off" condition, then binary 13 provides an output in response to the 2nd, 4th, 6th, etc. pulses from input 11. Binary 14, then, receiving input pulses only from the output of binary 13, provides output pulses corresponding to the 4th, 8th, 12th, etc. pulses at input 11. Binary 14, then, first goes "on" in response to the second pulse at input 11; binary 15 on the 4th pulse at input 11; binary 16 on the 8th, and so forth. Thus, binary 14 first goes on after $2^1$ pulses, binary 16 after $2^2$ pulses, binary 17 after $2^3$, etc. Thus the characteristic of the logarithm of the number of pulses applied to input 11 may be obtained by determining the number of binaries above the lowest binary that have been turned "on" at least once, or equivalently by determining the uppermost binary in the chain which has been turned "on." Thus, in FIG. 1, each of the binary elements above the lowest, that is binaries 14 through 17, are coupled to a characteristic indicator 19 adapted to provide an indication of $n$. As indicated by the dotted lines, the series of binaries may be extended infinitely.

The mantissa of the logarithm is approximated by a value proportional to that fraction $x$ whose denominator is the highest integer power of two contained within the number of pulses and whose numerator is the difference between the number of pulses accrued and that integer power. But the number of pulses accrued after the highest integer power is indicated by the number and position of the binaries which are in the "on" position below the uppermost binary in the "on" position. For example, if at the conclusion of a measurement, binaries 17, 16, 14 are in the "on" position, then the 16th pulse turned binary 17 on and 10 pulses were accrued after that. Since the highest integer power of two contained in 26 is 4 and $2^4$ is 16, the fraction referred to above is (26−16)/16 or 10/16.

A mantissa generator 18 is coupled to each binary element and this generator determines the above fraction. It then applies an appropriate proportionality constant, such as 1.12, and transmits this information to mantissa readout 20.

The same fraction can be obtained by considering each binary below the uppermost "on" binary as a fractional remainder. In this manner the next lower binary represents ½; that below it, ¼; and so on. The sum of these fractions then provides the appropriate value of $x$. Hence in the above numerical example, binary 16 represents ½ and binary 14 represents ⅛. The fraction then equals ½+⅛ or 10/16.

Referring now to FIG. 2, pulse input terminal 11 is coupled through switch 12 to the input of a binary element 13. The binary element is again an element having two stable states, "on" and "off." The binary element 13 provides an output pulse to binary 14 when going from the "on" to the "off" state, that is, for every second pulse received at its input. Binary unit 14 is coupled to binary unit 15 which in turn is coupled to binary 16, and 16 to 17. Each of these five binary units provides the same action as that described for element 13. Associated with each of the first four binaries, 13 through 16, are "and" gates, 21 through 24 respectively. These are conventional "and" gates having two inputs and a single output, the output being activated only when both inputs are simultaneously activated. One of the input legs of "and" gate 21 is coupled to binary 13 and this input is activated only when that binary is in the "on" condition. One input of each of the gates 22, 23, and 24 is similarly coupled to binaries 14, 15, and 16 respectively. Also coupled to binary 14 is a flip-flop circuit 30 which receives a signal from binary 14 when the binary goes from the "off" to the "on" condition. This flip-flop circuit 30 has the characteristic of changing state in response to the first such signal from binary 14, but remaining in the second state despite further signals from binary 14. When the flip-flop changes state, it provides an output pulse to trunk line 34. Each of the binaries above binary 14, that is binaries 15, 16, and 17, have corresponding flip-flop circuits 31, 32, and 33 respectively, all of which provide their output signals to trunk line 34. Trunk line 34 is connected to the input of a decade scaling unit 25 which provides an indicating readout of the total number of pulses it has received and which serves, as will be explained in detail below, as the characteristic indicator of the logarithm of the total number of pulses received at pulse input, terminal 11.

A second group of binary elements 41 through 44 are also cascaded and form a binary chain independent of the "counting" binary chain 13 through 17. This second set of binaries, 41 through 44, is not coupled to input terminal 11 but rather is connected to mantissa pulse shaper 40 providing a shaped output pulse for each input pulse received from the mantissa generator 45. Mantissa generator 45 operates as a triggered oscillator providing a predetermined total number of pulses at a predetermined frequency in response to a trigger input from program control unit 50. This trigger input is provided at the conclusion of a counting interval. Each of the binaries 41 through 44 provides an output pulse to the next successive binary element when going from the "on" to the "off" condition. Each of these binaries also provides a second independent output. The second output from binary 41, for example, is coupled to the second input leg of gate 24, and the second outputs from binaries 42, 43, and 44 are coupled in the same fashion to the second inputs of gates 23, 22, and 21 respectively. These second outputs from binary units 41 through 44 are provided when the binary is changing from the "off" to the "on" condition; hence, the operation is that in response to one pulse the binaries 41 through 44 provide an output to the next successive binary and in response to the next pulse they provide an output to their respective "and" gates. Because of this alternating arrangement, the pulses provided to any one of the "and" gates cannot be in time coincidence with pulses to any other "and" gate.

Each of the binary elements, 41 through 44, is provided with a by-pass unit, 51 through 54 respectively. Each by-pass unit has two conditions: in the first condition, by-pass "on," it prevents pulses from being applied to the input of its associated binary and passes these pulses directly to the input of the next binary. In the second condition, by-pass "off," the by-pass unit allows pulses to reach the input of its associated binary and fails to pass pulses to the input of the next binary. The normal condition of the by-pass unit is by-pass "on," that is, by-passing the associated binary unit. Each of the by-pass elements is controlled by the output of one of the flip-flop units 30 through 33 and a signal on the flip-flop output operates to change the state of the by-pass unit to the non-by-passing condition. Thus, by-pass unit 51 is rendered not by-passing by an output signal from flip-flop 33, which signal is generated by the first change of state of binary element 17 from the "off" to the "on" condition. Correspondingly, by-pass units 52, 53, and 54 are inhibited by the action of flip-flop units 32, 31, and 30 respectively.

As previously indicated, each of the gates 21 through 24 are adapted to provide an output pulse each time that the two input legs are simultaneously activated, and these output pulses are coupled to the input of two cascaded decade scales, 26 and 27, which serve as mantissa readout indicators. The second decade scale, 27, provides a cascade output to the input of the characteristic decade 25.

A reset unit 60 is operated by the program control unit 50 and provides, at the conclusion of the logarithmic readout, a reset pulse to each of the units in order to ready the circuit for another counting interval. The control unit may also, as indicated by dotted line 61, open and close switch 12 at predetermined intervals for a predetermined time.

Having described the component elements and their interconnection in this apparatus, the operation will now be discussed. The over-all function of this apparatus is, as previously indicated, to provide as an output the digitally computed logarithm to the base 2 for the total number of pulses provided at pulse input terminal 11 over some predetermined period. The pulses supplied at input terminal 11 may be either randomly occurring in time or at a regular frequency.

The operation of this apparatus will be considered first in terms of deriving the characteristic of the logarithm of the number of pulses and then in terms of deriving the appropriate mantissa. Since the input pulses are applied to a chain of cascaded binaries, 13 through 17, each of which (except the first) has the characteristic of providing an output pulse through the corresponding flip-flop unit only the first time that each such binary goes from the "off" to the "on" position, then one pulse is provided from each such binary at the time it first changes to the "on" condition. The total number of such pulses, then, corresponds to the highest integral power of two contained within the total number of pulses supplied at input 11. Since the flip-flop output pulses are coupled to the input of the decade scale 25, this scale reads out the highest integral power of two contained within the total number of pulses measured and this is, by definition, the characteristic of the logarithm to the base 2 of this total number of pulses. Taking a specific example, if nine pulses were applied to the input, then the second pulse would turn binary 14 on providing an output pulse from flip-flop 30, the fourth pulse would turn binary 15 on providing a pulse from flip-flop 31, and the eighth pulse would turn on binary 16 providing a pulse from flip-flop 32. The characteristic scaler would then indicate three, which is, of course, the proper characteristic of the log to the base 2 of 9.

Turning now to the mantissa operation, it should be understood that the pulse train representing the mantissa of the logarithm to the base 2 of the number is not generated, as in the case of the characteristic, while the pulses are being applied to input 11, rather, during the measuring cycle conditions are established such that the proper mantissa pulse train can be generated at the conclusion of the measuring cycle. These conditions are represented by the state, at the conclusion of a measuring cycle, of the "and" gates and by-pass units.

At the conclusion of a measuring cycle, control unit 50 applies a signal to switch 12 which opens this input switch and the same control unit 50 also applies a trigger pulses to mantissa pulse generator 45. The mantissa pulse generator 45 provides a train of pulses at a fixed frequency for a predetermined total number of pulses.

The mantissa pulse generator operating into the second chain of binaries in conjunction with the "and" gates and by-pass units serves the function of summing the fractional remainders. The by-pass units serve to by-pass those "mantissa" binaries (41 through 44) associated with the uppermost "on" and higher "counting" binaries in the chain 13 through 17. Thus, if binary 16 is the uppermost "on" binary, the mantissa pulses are directly applied to the binary 42, which is associated with binary 15. To continue with this example, if the mantissa pulser provided 100 pulses, then the output to the "and" gate 23 would be 50; which decimally can be used to represent ½; the number applied to 43 would be 25 representing ¼ and so on. By applying 112 pulses instead of 100 the fractions are effectively multiplied by a factor of 1.12. The "and" gates provide that the only fractions summed are those representing "on" binaries in the counting chain. Thus, when pulses from one of the binary units 41 through 44 are provided to an "and" gate, the second input leg of which is activated, each pulse from the binary unit provides a pulse on the output of the "and" gate. The outputs from the "and" gates are all coupled into the first mantissa decade scale 26 which is itself coupled into the second mantissa decade scale 27. Thus, the pulses from the gates 21 through 24 are totalized to provide a mantissa readout.

Again, taking the same numerical example, if nine pulses are totalized, then binary 16 and binary 13 are lighted; hence, gate 24 and gate 21 have one input leg activated. Since each of the binaries 14, 15, and 16 were lighted during the totalizing process, then each of the flip-flops 30, 31, and 32 were activated; hence, by-pass gates 52, 53, and 54 are all in the non-by-passing condition. Since by-pass unit 51 has remained in the by-passing condition, binary unit 41 receives no input pulses and hence, no pulses are provided to the input of gate 24. By-pass units 52 through 54, however, have been changed into the non-by-passing state and hence, binaries 42 through 44 do provide output pulses. Since it is only gate 21 whose second leg is activated (by binary 13) it is only this gate which provides a series of input pulses to mantissa gate 26. The number of pulses on the output of gate 21 is, of course, equal to the number of pulses from binary unit 44, and this in turn is determined by considering the number of non-by-passed binaries between the mantissa pulse generator 45 and this unit. Since all mantissa binaries through binary 42 are non-by-passed, then binaries 42 through 44 introduce a division factor of 8. Thus, the output of the binary 44 is 112 divided by 8, or 14 pulses, and the mantissa would then be recorded as .14. As previously indicated, the characteristic in this instance would be three; hence, the logarithm to the base 2 would be recorded as 3.14, whereas the correct value of this logarithm is 3.17. Hence, there is an error in the logarithm of —.03. As previously indicated, the average error of such a system over a wide range of numbers is substantially 0, with a root mean square deviation of .045.

At the conclusion of readout of the logarithm, the program control unit 50 provides a reset signal to the reset unit 60 which then provides for electrical reset for all of the binaries and flip-flop units in the system. The control unit can be arranged to then close the pulse input switch 12, in order to measure the logarithm of the next series of pulses.

The apparatus shown in FIG. 2 may also be used to present the digitally computed logarithm to a base other than two by inserting a dividing scale at the input to the decade scale readouts. For example: the $\log_{10}N = A \log_2 N$, where $A = \log_{10} 2$. Hence, by inserting a multiplying factor of .30 before the output indication, the log to the base 10 may be provided. In the same fashion, the apparatus may provide a readout indication in terms of the natural logarithm by using a multiplying factor of .693.

While the above system has been described in terms of a specific number of basic cascaded elements with associated gating elements, it is apparent that very many basic binary elements may be cascaded, thereby forming a system capable of providing logarithmic readout of a very large number of totalized pulses. While in the embodiment described above, the mantissa pulse generator provided a 112-pulse series, the invention described is not so limited. For example, the number of pulses provided may be selected to provide a minimum dispersion in error rather than an average error of zero. In this instance, the output indicator could, of course, have a fixed bias so that the output error would still have an average error of zero. Again, the described embodiment constituted a system for deriving the logarithm to the base 2, but the principles of the invention also apply to determining the logarithm to any of several numerical bases by using scales of three or ten, for example, in place of the binary elements shown. In such cases, however, the errors introduced by the linear interpretation become correspondingly more significant.

Having described the invention herein, it is apparent that many modifications and improvements may now be made by those skilled in the art, and it is intended that the invention disclosed herein should be limited only by the spirit and scope of the appended claims.

What is claimed is:

1. Apparatus providing the logarithm to the base two of a number characterized by a number of pulses received at its input in a predetermined interval comprising, a plurality of binary elements connected in serial cascade, each of said binary elements being adapted to provide in response to each two pulses applied to it one binary output pulse to the next successive one of said binary elements; means for indicating the number of said binary elements which have received at least one of said binary output pulses during said predetermined interval as an output indication of the characteristic of said logarithm; and means for providing an output indicating the mantissa value of said logarithm.

2. Apparatus providing the logarithm to a predetermined base of a number characterized by a number of pulses received at its input during a predetermined period comprising, a plurality of binary elements having first and second stable states connected in serial cascade; each of said binary elements being adapted to provide one output pulse to the next successive one of said binary elements in response to each two pulses applied to it, each of said binary elements being in a first state at the start of said predetermined interval; each of said binaries being adapted to change state in response to each pulse applied to it; means adapted to provide an output related to the number of said binaries which have changed from said first to said second state at least once during said interval as an indication of the characteristic value of said logarithm; means operative at the conclusion of said interval for providing an output related to a fraction whose denominator equals the number of pulses required to change the state of the one of said binaries in said serial cascade most removed from said input that changed state during said interval, and whose numerator equals the number of pulses received at said input minus the said denominator, as an indication of the mantissa value of said logarithm.

3. Apparatus providing the logarithm to a predetermined base of a number characterized by a number of pulses received in a predetermined interval comprising, a plurality of binary elements connected in serial cascade; means for applying said pulses received in said predetermined interval to the first of said plurality of binary elements in said cascade; said first binary element being adapted to change state in response to each of said pulses, the remainder of said plurality of binary elements being adapted to change state in response to alternate changes of state in the next preceding one of said binaries; means for determining the one of said binaries in said serial cascade farthest removed from said first binary, which changed state during said interval; means for presenting digitally an output related to the position of said uppermost changed binary as an indication of the characteristic of said logarithm; digital means for providing as an indication of the mantissa value an output proportional to the fraction having as a denominator the number of pulses applied to said binary chain until the change of state of said farthest removed binary to change state, and, as a numerator, the number of pulses applied to said binary chain after the change of state of said farthest removed binary to change state.

4. Apparatus providing the logarithm to a predetermined base number of a number characterized by a number of pulses received in a predetermined interval comprising, a first binary element having an input and an output, means for applying said received pulses to said first binary input, said first binary element being adapted to provide an output pulse in response to every other pulse received at said input; a binary counter chain including a plurality of serially connected binary counters, each of said binary counters having an input and an output, said output of each of said binary counters being coupled to the input of the next successive one of said binary counters, the output of said first binary element being coupled to the input of the first of said binary counters in said chain; individual means associated with each of said binary counters for generating an output in response to the first pulse only received at the associated one of said binary counters; accumulator means adapted to accumulate said output signals from all of said individual means and to provide an output indication related to the total of said accumulated signals as the characteristic of said logarithm; means adapted to determine the uppermost one of said binary counters in said serially connected counter chain to receive at least one pulse; means adapted to provide as a mantissa indication a signal related to the value of a fraction whose denominator equals the number of pulses required to be received at said first binary input to allow said uppermost binary that has received a pulse to receive that pulse, and whose numerator equals the number of pulses received during said interval minus the value of said denominator.

5. Apparatus providing the logarithm to a predetermined base number of a number characterized by a number of pulses received in a predetermined interval comprising, a plurality of counting elements connected in serial cascade, each of said counting elements being adapted to provide a single output pulse to the next successive one of said counting elements in response to a number of pulses equal to said predetermined base number being applied to it; means for determining the number of said counting elements which have received at least one of said counting element output pulses during said interval; said means being adapted to provide said number of counting elements minus one as an output indication of said logarithm characteristic value; means for providing an output indicative of the mantissa value of said logarithm.

6. Apparatus in accordance with claim 5 wherein said means for providing a mantissa value comprises means for providing an output proportional to the fraction whose denominator equals the number the logarithm of which equals said characteristic value and whose numerator equals said number of pulses received during said interval minus said denominator.

7. Apparatus providing the logarithm to a predetermined base number of a number characterized by a number of pulses received during a predetermined interval comprising, an input element adapted to receive said pulses and to provide one output pulse in response to every other one of said received pulses; a counter chain including a plurality of serially connected counter stages, each having first, second, and third outputs and an input, each of said first outputs being connected to the input of the next successive stage, each of said stages being characterized by having two stable states, each of said stages being adapted to change from one stable state to the other in response to every pulse applied to its input, the output of said input element being coupled to the input of the first of said stages in said counter chain, each of said counter stages being adapted to provide at the respective first output a pulse in response to every two pulses applied thereto, each of said counter stages being adapted to provide on a second output a pulse in response only to the first change of state of said counter stage, each of said counter stages being adapted to provide on a third output an actuating signal when said stage is in a selected one of said stable states; means for providing an output signal related to the number of pulses produced by said second outputs of said counter stages as an indication of the characteristic value of said logarithm; a mantissa chain, said mantissa chain including a plurality of serially connected mantissa stages, each having an input and first and second outputs, each of said mantissa stages being associated with one of said counting stages; a mantissa pulse generator operative at the conclusion of said predetermined interval and adapted to provide a predetermined number of pulses to the input of the first one of said mantissa stages, said first mantissa stage being associated with the one of said counting stages immediately preceding the last one of said counting stages in said serially connected chain; each of said mantissa stages including a binary element and a bypass unit, each of said mantissa binary elements being adapted in response to every two pulses applied to produce a single pulse on a first output thereof coupled to the next successive one of said mantissa stages, each of said bypass units being adapted to inhibit the input of its associated mantissa binary and to couple the output of the preceding one of said mantissa stages to the input of the next successive one of said mantissa stages, said second output of each of said counting stages being coupled to the one of said mantissa stages associated with the preceding one of said counting stages in a manner such that an output pulse from each of said counting stages second output renders said bypass unit of said mantissa stage coupled to it inoperative; a plurality of "and" gates, each of said "and" gates being associated with one of said counting stages and the associated one of said mantissa stages, said third output from each of said counting stages being coupled to one input of the respective associated "and" gate, each of said mantissa binaries providing in response to every two pulses applied to it a single pulse on said respective second outputs; each of said mantissa binary second outputs being coupled to the second input of its respective associated one of said "and" gates, said "and" gates being adapted to provide an output pulse in response to each pulse applied to its said second input leg when said first input leg is receiving an actuating signal; means for providing an output signal related to the number of pulses produced from all of said "and" gates for said predetermined interval as an indication of the mantissa value of said logarithm.

8. Apparatus providing the logarithm to a predetermined base member of a number characterized by a number of pulses received during a predetermined interval comprising, an input element adapted to receive said pulses and provide one output pulse in response to every two of said received pulses; a counter chain including a plurality of serially connected counter stages, each of said counter stages having first and second stable states, the output of said input element being coupled to the input of said counter chain, each of said counter stages being in said first state at the beginning of said predetermined interval, each of said counting stages being adapted to change state in response to each pulse applied to it, each of said counter stages being adapted to provide a single pulse to the next successive counter stage when changing from said second state to said first state; means adapted to determine the number of said stages which changed at least once from said first to said second state during said interval, said means being adapted to provide an output signal related to said number as an indication of the characteristic value of said logarithm; a mantissa pulse generator operative at the conclusion of said predetermined interval and adapted to provide a predetermined number of output pulses; a plurality of serially connected mantissa stages having an input and first and second outputs, each of said mantissa stages being associated with one of said counter stages, connecting means adapted to couple the output of said mantissa pulse generator to said input of the one of said mantissa stages associated with the one of said counter stages immediately preceding the one of said counter stages farthest removed from said input element which changed from said first to second state during said predetermined interval; each of said mantissa stages being adapted in response to every two pulses applied to it to provide a single pulse on said first output to the input of the next successive one of said mantissa stages, each of said mantissa stages associated with one of said counter stages in said second state at the conclusion of said predetermined interval being adapted to provide a single pulse in its said second output in response to each two pulses applied to its input; a mantissa readout adapted to accumulate said pulses from said second outputs of said mantissa stages, the total number of said pulses accumulated in said mantissa readout serving as an indication of the mantissa value of said logarithm.

9. Apparatus in accordance with claim 8 wherein each of said mantissa stages binary elements have a first and a second state, all of said mantissa binary elements being in said first state at the beginning of said predetermined interval, each of said mantissa binaries providing a pulse to the input of this next successive one of said mantissa stages when changing from said second to said first state, each of said mantissa binaries providing an output pulse on its said second output to said mantissa readout when going from said first to said second state.

10. Apparatus in accordance with claim 8 wherein said predetermined number of mantissa pulse generator pulses equals 112.

No references cited.